March 3, 1953 — E. J. DIEHL — 2,630,167
BURNER IGNITION AND CONTROL SYSTEM
Filed Oct. 27, 1950 — 2 SHEETS—SHEET 1
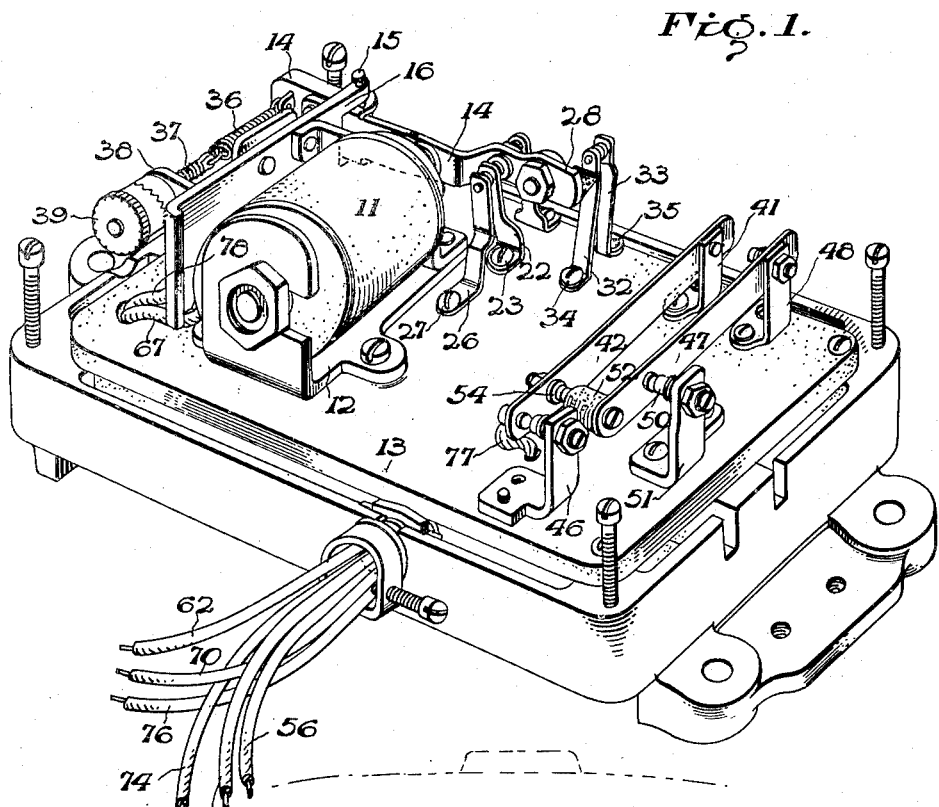
Fig. 1.
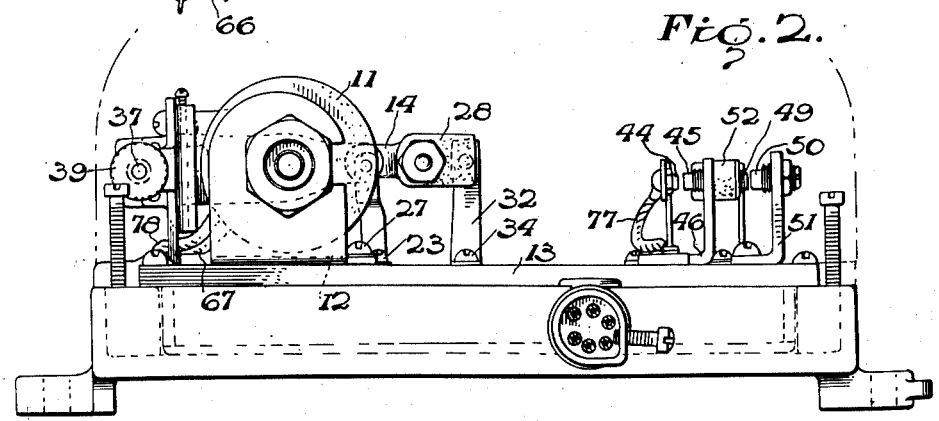
Fig. 2.
INVENTOR.
Edward J. Diehl.
BY
ATTORNEY March 3, 1953        E. J. DIEHL        2,630,167
BURNER IGNITION AND CONTROL SYSTEM
Filed Oct. 27, 1950        2 SHEETS—SHEET 2
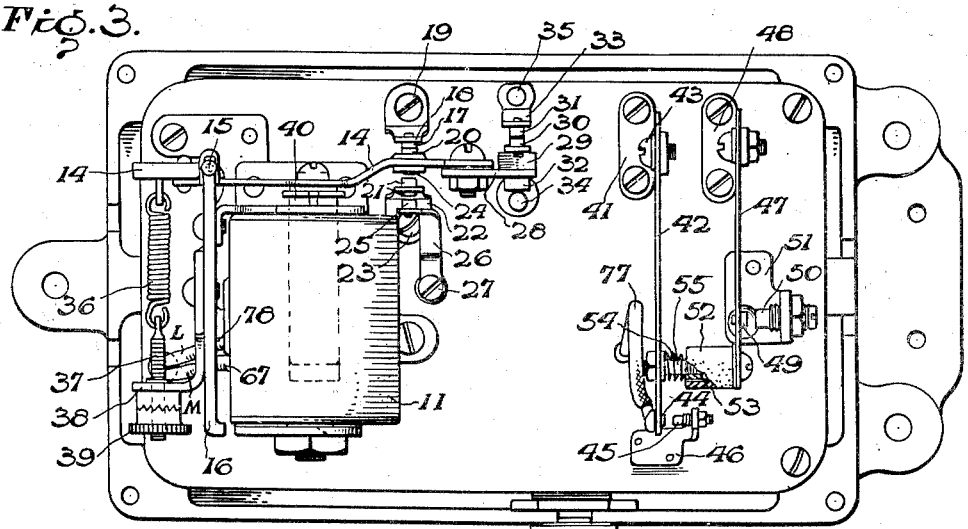
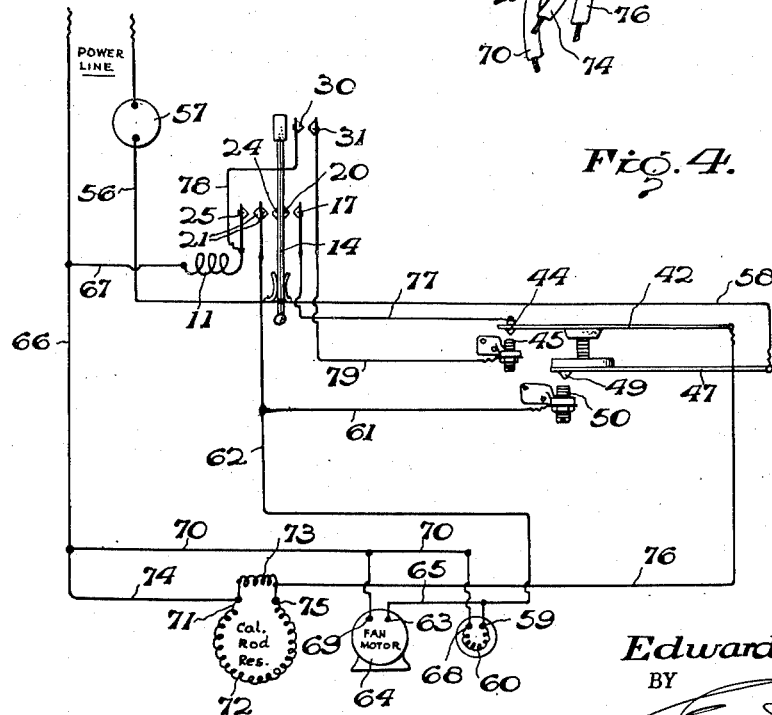
INVENTOR.
Edward J. Diehl.
BY
ATTORNEY Patented Mar. 3, 1953

2,630,167

UNITED STATES PATENT OFFICE 2,630,167

BURNER IGNITION AND CONTROL SYSTEM

Edward J. Diehl, Silverton, N. J., assignor to Farspan Industries, Inc., Island Heights, N. J., a corporation of New Jersey Application October 27, 1950, Serial No. 192,512

1 Claim. (Cl. 158—28)

This invention relates to electrical systems and is more particularly concerned with an electrical device containing a plurality of switches in combination with and for the automatic operation of a liquid fuel burner. In normal use, said fuel burner requires the operation of a number of units in series through a definite cycle for the purpose of starting it when heat is needed, then maintaining it in operation and stopping its operation when heat is no longer required.

More specifically, the operation of the burner requires the closing of a switch in a circuit containing an electrical heating element (calrod) in contact with the liquid fuel in a gasification chamber to cause gasification of fuel and the energizing of a resistance plug igniter in the combustion chamber which is adjacent the gasification chamber. When sufficient heat has been applied to cause the generation of a predetermined amount of gaseous fuel (ordinarily about 1½ minutes) another circuit is closed to open a fuel valve, start a fuel pump for the purpose of continuously pumping fresh fuel to the gasification chamber and to start a motor that drives an air blower for supplying combustion air to the combustion chamber. When sufficient heat and a sufficiently high temperature has been developed in the combustion chamber to cause gasification of liquid fuel in the adjacent gasifying chamber without assistance from the electrical heating element, and ignition in the combustion chamber without assistance from the ignition plug (usually an additional ½ minute), the circuit of the electrical heating element and of the ignition plug are opened whereby the operation of the burner continues automatically from the heat developed in the combustion chamber alone. When heat no longer is required, the opening of a thermostat switch causes the fuel valve to close and the fuel pump and the air blower motors to stop. This comprises a complete cycle of operation.

Accordingly, the general object of this invention is the provision of an electrical system for automatically controlling the operation of the units aforesaid in accordance with the cycle of operation described.

Another object is to provide an electrical control system comprising a compact and self-contained unit that can be readily connected by means of a few electrical conductors to the burner unit and to a thermostatic control unit for complete installation.

A further object of the invention is a control system of the type mentioned which can be adjusted to vary the factors of a cycle of operation of the burner elements.

These and other objects and advantages of this invention will appear more fully from the following description considered together with the accompanying drawings, in which:

Figure 1 is a perspective view of an embodiment of the invention.

Figure 2 is a front elevational view of the same embodiment.

Figure 3 is a plan view of the embodiment.

Figure 4 is a simplified wiring diagram of the electrical circuit.

Referring with more particularity to the drawings, in which like numerals designate like parts, the embodiment illustrated comprises a magnetic relay coil 11 secured to a bracket 12 on a base block 13. The armature 14 of the relay coil is hinged at 15 to a vertical extension 16 of bracket 12. Adjacent the rearward side of the armature an electrical contact point 17 is disposed and it is secured to a vertical arm 18. The bottom of the arm is attached to the base block 13 by means of a terminal post 19. The contact point 17 normally engages a contact point 20 secured to the armature 14. Adjacent the forward side of the armature a second contact point 21 is similarly disposed on a vertical arm 22 secured to the base block by a terminal post 23. The contact point 21 is adapted to engage a contact point 24 attached to the armature, but these contact points are disengaged in normal resting position as shown in Figure 3. The contact point 21 projects forwardly through the arm 22 for engaging a third contact point 25. The latter is held on a vertical arm 26 that is attached to the base block by a terminal post 27. The contact point 25 is also disengaged from contact point 21 in normal resting position.

To the outer end of the armature an extension 28 is attached which carries an electrically insulated knob 29 that normally urges a contact point 30 in engagement with a complementary contact point 31. These contact points are supported by vertical resilient arms 32 and 33, respectively, secured to the base block by terminal posts 34 and 35, respectively.

When the relay coil is in its unexcited state the armature 14 is urged rearward by a spring 36 which has one end attached to the armature and the other end to the bracket 16. The bracket connection is made through an adjustment screw consisting of a threaded rod 37 slidably engaging a flange 38 of the bracket and a thumb nut 39 on the rod in abutting relation with the said flange. Accordingly, by adjusting the position of the thumb nut on the threaded rod the tension on the spring 36 may be changed.

Under the action of the said spring 36 the armature is urged rearwardly and forces the contact points 17 and 20 together and the contact points 30 and 31 together. In this position also the contact points 21, 24 and 25 are disengaged from each other.

Forward movement of the armature is effected by excitation of the relay coil 11 acting on its movable core 40 which is secured to the armature 14.

On a bracket 41, one end of a warpable bimetallic strip 42, or other thermo-movable device, is attached, such as by the bolt 43. The other end of the strip 42 is free to move and carries a contact point 44 which is adapted to contact an adjustable stationary contact point 45 attached to bracket 46.

Parallel to the strip 42 is a resilient strip 47 of metal, such as brass, or other suitable material, having one end secured to a bracket 48 on the base block adjacent the bracket 41. The other end of the strip 47 carries a contact point 49 adapted to engage an adjustable stationary contact point 50 on the side opposite the bimetallic strip 42 and supported on a bracket 51.

The side of the strip 47 facing the bimetallic strip 42 carries a hollow cup 52 having an insulated lining 53 in which one end of a coil spring 54 is disposed. The other end of the coil spring projects beyond the member 52 and abuts the side of the bimetallic strip 42. It is prevented from displacement in this position by means of a finger 55 attached to the strip 42 and projecting part way into the coil 54.

The elements described above are electrically connected as follows:

One conductor 56 of the power line contains the usual thermostatic control switch 57 and is connected to armature 14. The armature is connected to the fixed end of the resilient metallic strip 47 by conductor 58. The stationary contact point 50 is connected to the terminal 23 and to one terminal 59 of the magnetic fuel valve 60 by conductors 61 and 62. It is also connected to one terminal 63 of the fan motor 64 by conductor 65.

The other conductor 66 of the power line is connected to one terminal of the magnetic relay coil 11 by conductor 67, to the other terminals 68 and 69 of the magnetic fuel valve and the fan motor, respectively, by conductor 70 and to a common terminal 71 of the electric heating element or calrod 72 and the resistance plug igniter 73, by conductor 74. The other common terminal 75 of the calrod and ignition resistance is connected to the stationary end of the bimetallic strip 42 by conductor 76 while the movable end of said strip 42 is connected to the terminal 19 of the contact point 17 by conductor 77. The stationary contact point 45 is connected to the terminal 35 of the contact point 31 by conductor 79 while the terminal 34 of the adjacent contact point 30 is connected to the other terminal of the relay coil and to the terminal 27 of the contact point 25 by conductor 78.

In normal resting position the contact points 30 and 31 are forced into contact with each other and the contact points 17 and 20 are forced into contact with each other by the spring biasing of the armature 14 rearwardly. On the front side of the armature 14 the contact points 21, 24 and 25 are disengaged from each other. Also, the contact points 49 and 50 are disengaged as well as the contact points 44 and 45.

When the switch of the thermostat 57 is closed, current flows through the conductor 56 to the armature 14, through the contact points 17 and 20, through conductor 77, through the bimetallic strip 42, through conductor 76, through the ignition resistance 73 and calrod 72, conductor 74 and power line conductor 66. This has the effect of simultaneously placing both the calrod and ignition plug in operation. It also causes the bimetallic strip 42 to become heated and begin warping by virtue of the resistance to the current passing through it. As a result of this warping the free end of the strip 42 moves inward and, through the spring connection 54, pushes the adjacent resilient strip 47 with it until the contact point 49 engages the contact point 50, thereby closing the circuit containing the fan motor 64 and the magnetic valve 60 through conductors 58, 61, 62, 65 and 70. At this instant the contact points 44 and 45 are not yet in engagement and the fuel is being gasified by the calrod 72 in the gasifying chamber. Also fuel is being fed through the chamber by the opening of the magnetic fuel valve 60 and air is being delivered to the ignition chamber by operation of the fan motor 64. The mixture of air and fuel vapor in the ignition chamber is being ignited by the ignition plug 73.

As the bimetallic strip 42 continues to heat and warp, it moves farther inward until the contact points 44 and 45 engage thereby causing current to flow through the magnetic coil 11 of the relay through the conductors 78 and 79 and the contact points 30 and 31. As soon as this occurs, the armature 14 is pulled over toward the relay coil causing mutual contact of the contact points 24, 21 and 25 and simultaneously causes disengagement of the contact points 30 and 31 and of the contact points 17 and 20. The armature is maintained in this position by current flowing through the circuit consisting of the coil 11, contact points 25, 21 and 24 and the armature itself. The disengagement of the contact points 30 and 31 and contact points 17 and 20 opens the circuit containing the calrod and the ignition resistance while at the same time the operation of the fan motor 65 and the magnetic fuel valve 68 is continued to be maintained through a substitute circuit through the contact point 21 which is connected to the conductor 62. During this period of operation the bimetallic strip cools and returns to its normal position of rest thereby separating the contact points 44 and 45 and the contact points 49 and 50.

When the switch of the thermostat 57 opens, current no longer flows to the unit whereby the magnetic coil 11 is de-energized and the armature returns to its normal position of rest under the action of the spring 36.

I claim:

In combination with a liquid fuel burner having an electrical heating element for gasifying fuel, electrical ignition means for igniting gasified fuel, an electrical fuel valve and an electric motor connected to an air blower; a control unit for controlling the operation of said heating element, ignition means, valve and motor, comprising an electromagnetic coil; an armature movable in response to excitation of said coil; yieldable means biasing said armature against such movement; a first normally closed switch and a second normally closed switch, said switches being both held in their normally closed positions by said armature in its biased position; a pair of normally open switches having operators adapted to be moved to their closed positions by said armature when the armature is moved under the influence of said coil; an electrically heatable bimetallic strip; electrical power line conductors; a first electrical circuit containing the first switch in series with said strip, electrical heating element, and power line conductors, said circuit also containing said ignition means; a third normally open switch; a second circuit in parallel with the first circuit and containing said third normally open switch, fan motor and fuel valve; said third normally open switch having an operator connected to and being actuatable by, but electrically insulated from, said bimetallic strip; a fourth normally open switch having a pair of contact members, one contact member being movably carried by said bimetallic strip and the other being adjustably fixed relative thereto so as to permit adjusting the time of closing thereof in relation to the closing of said third normally open switch; said fourth normally open switch being electrically connected to said second normally closed switch and said coil; a substitute circuit for said second circuit, said substitute circuit containing one of the switches of said pair of normally open switches, said fan motor, and fuel valve, exclusive of said bimetallic strip, heating element and ignition means, and containing also said power line conductors, and a second substitute circuit containing said coil, said pair or normally open switches and said power line conductors.

EDWARD J. DIEHL.

REFERENCES CITED

The following references are of record in the file of this patent:

UNITED STATES PATENTS

| Number | Name | Date |
|---|---|---|
| 1,816,451 | Wallace | July 28, 1931 |
| 1,952,299 | Van Valkenburg | Mar. 27, 1934 |
| 1,986,553 | Brandenburger | Jan. 1, 1935 |
| 2,070,118 | Denison | Feb. 9, 1937 |
| 2,135,829 | McGoldrick | Nov. 8, 1938 |
| 2,143,076 | Koerner | Jan. 10, 1939 |
| 2,231,212 | Miller | Feb. 11, 1941 |
| 2,463,470 | Sherwood | Mar. 1, 1949 |
| 2,498,127 | Kuhn | Feb. 21, 1950 |